Figure 1:
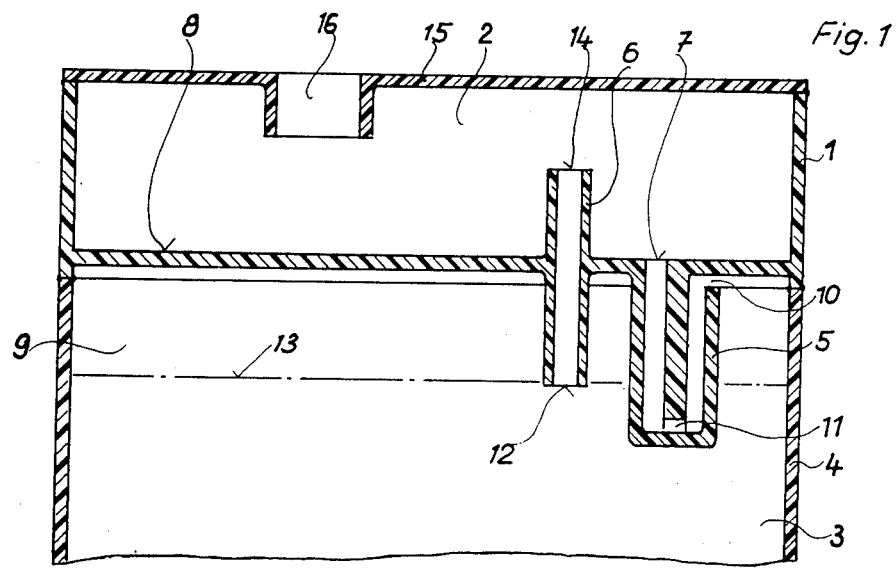

United States Patent [19]
Perkams

[11] 4,008,355
[45] Feb. 15, 1977

[54] STORAGE BATTERY WITH COMMON EXPANSION AND FILLER CHAMBER

[75] Inventor: Wilhelm Perkams, Oberrot, Germany

[73] Assignee: AS-Motor GmbH KG, Oberrot, Germany

[22] Filed: Mar. 4, 1976

[21] Appl. No.: 663,757

[30] Foreign Application Priority Data
Apr. 19, 1975 Germany .......................... 2517497

[52] U.S. Cl. .................................. 429/63; 429/73
[51] Int. Cl.[2] .......................................... H01M 2/36
[58] Field of Search ............. 136/162, 170; 429/63, 429/73

[56] References Cited
UNITED STATES PATENTS

| | | | |
|---|---|---|---|
| 1,793,136 | 2/1931 | Roth | 136/162 |
| 1,878,223 | 9/1932 | Woodbride | 136/162 |

FOREIGN PATENTS OR APPLICATIONS

| | | | |
|---|---|---|---|
| 2,402,920 | 7/1975 | Germany | 136/162 |
| 1,099,741 | 1/1968 | United Kingdom | 136/162 |

Primary Examiner—Donald L. Walton
Attorney, Agent, or Firm—Flynn & Frishauf

[57] ABSTRACT

To prevent differential electrolyte levels in the various cells of a storage battery having a common expansion and filler chamber, while preventing internal short circuits through the electrolyte, each cell is formed with an overflow tube extending just below the normal electrolyte level of each cell, and an inlet tube flush with the expansion and filler chamber and having general U-shape, extending first downwardly and then upwardly, the U-shaped tube being at least partly filled with electrolyte to form resistance to flow of gases and electrolyte liquid from a particular cell back into the expansion and filler chamber through the inlet tube, rather than through the overflow tube, which extends above the wall separating the common expansion and filler chamber and the individual cell. A constriction or fluid choke may additionally be included in the U-shaped tube which is preferably constructed as a stub pipe extending from the common expansion and filler chamber into a side pocket formed at the side wall of the battery, each pocket being in open fluid communication with the respective cell just beneath the separating wall, the pockets being molded at the outside walls of the cells of the battery box so that plates or square configurations can be inserted therein.

10 Claims, 2 Drawing Figures

STORAGE BATTERY WITH COMMON EXPANSION AND FILLER CHAMBER

Cross reference to related Japanese Utility Model No. 46-33794.

The present invention relates to an electrical storage battery having a filler and a storage space which is common to all the cells of the storage battery, and more particularly to such a storage battery which is so constructed that it is essentially immune to changes in electrolyte level differentials in the various cells.

Multi-cellular electrical storage batteries usually are so arranged that the cells are placed adjacent each other. Due to shocks, tipping, differential rates of charging and discharging of the various cells, and the like, the separate individual cells may have different levels of electrolyte therein. Differences in levels of a electrolyte between the cells interfere with proper operation of the entire battery, and with its life. If, for example, the electrolyte in some of the cells has risen to an excessive level, the electrolyte itself may form a galvanic connection between adjacent cells by entering the respective overflows or filler tubes extending into the expansion space. This excessive electrolyte will act as a short-circuiting conductor resulting in an undesired high internal discharge of the battery.

It is an object of the present invention to provide an electrical storage battery which has the advantage of known storage batteries with a common filler and expansion space, but which is so constructed that, even if the electrolyte level between the cells should change, a common level will automatically reestablish itself at a desired height, without using valves, porous inserts, or the like. Preferably, the arrangement should be so made that it can be easily manufactured.

SUBJECT MATTER OF THE PRESENT INVENTION

Briefly, the inlet connection between a common filler space and any one of the individual cells is U-shaped; this inlet connection is formed with flow resistance means located between the expansion space and the individual cell in order to increase the resistance of fluid flow. The flow resistance portion is so dimensioned that gas pressure arising in the individual cell tends to drive liquid from the cell through an overflow tube into the expansion space before the gas can drive electrolyte through the inlet tube into the expansion space. The overflow tube, typically, extends for some distance above the bottom wall of the expansion space so that galvanic connection between liquid from the overflow tube and a liquid pool in the expansion space is inhibited. Typically, the flow resistance means are a column of liquid itself.

In a preferred form of the invention, the housing or box for the battery is formed with a side pocket at the side wall of any one of the cells in which the respective inlet tubes terminate. The side pocket is open at the top and communicates with a gas expansion space of the respective cell. A tube stub extends from the common expansion space into the gas space, the lower end of which is spaced from the bottom of the pocket. The stub forms a gap, open at the top with a pocket. The flow resistance in the inlet tube is increased by forming the inlet tube as a stub pipe as well, having a length which is greater than the height of the overflow tube.

Figure 2:
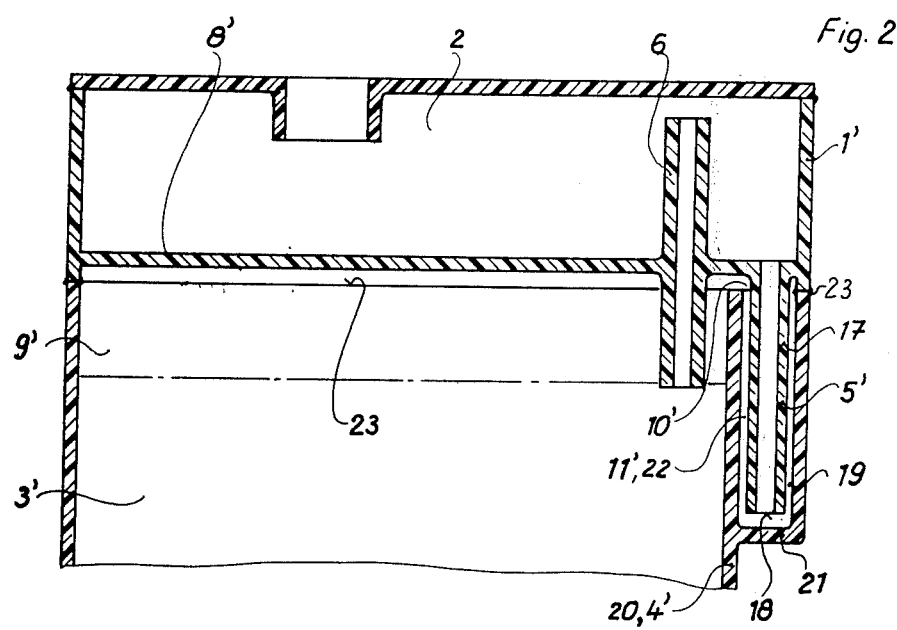

The invention will be described by way of example with reference to the accompanying drawings, wherein:

FIG. 1 is a schematic longitudinal sectional view through the upper region of a cell of a storage battery, in which the desired electrolyte level is shown by a chaindotted line, and in which the battery plates have been omited for simplicity; and FIG. 2 is a longitudinal view through a cell and illustrating a preferred embodiment in which, again, the desired electrolyte level is indicated by a chain-dotted line and the battery plates have been omited.

The battery housing 1 is formed of plastic material; the upper region of the battery housing has a common filler and expansion space 2 which communicates with all the cells 3. The top of the housing is secured to the lower portion or battery box 4, likewise of plastic material, in a suitable and well-known manner. Each one of the cells 3 communicates with the expansion space 2 by means of an inlet tube 5, and further by means of an overflow pipe stub 6. The inlet tube 5 has an inlet opening 7 which is flush or approximately flush with the bottom wall 8 of the upper portion of the housing 1; it leads, in U-shaped configuration, to the gas expansion space 9 of the respective cell 3. The outlet opening 10 of the inlet tube 5 is located closely beneath the bottom wall 8 of the upper portion of the housing 1. The lower portion of the inlet tube 5 is formed with a constriction or flow choke 11 in order to further increase resistance against liquid flow.

The overflow tubes 6 for each one of the cells have lower openings 12 located approximately at the level 13, which is the electrolyte level (indicated by a chain-dotted line); the overflow stubs 6 extend above the wall 8 into the expansion space 2, so that the upper openings 14 thereof are above the expected liquid level in the expansion space 2. The outlet openings 10 of the inlet tubes 5 are higher than the inlet openings 12 of the overflow tube 6.

The choke or constriction 11 in the inlet tube 5 is so dimensioned that excess pressure arising in the gas space 9 of any battery cell, due to tipping of the battery, shocks, sloshing of the electrolyte, or for other reasons which cause the electrolyte level to rise, electrolyte liquid will rather escape from the individual cell 3 through the overflow tube 6 into the space 2 before gas will flow from the cell 3 through the inlet tube back into the expansion space 2.

Expansion space 2 is closed off at its upper wall by plate 15 which is secured in known manner to the housing 1; plate 15 is formed with a closable opening 16.

Operation: To fill the battery with electrolyte, the closure plug usually provided for opening 16 is removed and electrolyte liquid is filled through opening 16 in the top plate 15 into the expansion and distribution space 2. The electrolyte will flow through the inlet tubes 5 into the respective cell 3. When the electrolyte liquid just covers the lower openings 12 of the overflow tube 6, no further electrolyte will flow through the inlet tubes 5 since no air can escape from the gas space 9 above the electrolyte back into the space 2 through the overflow pipe 6. The desired electrolyte level 13 will thus be level and even in all the cells, determined by the length of the tube 6 below the wall 8. A small amount of electrolyte should remain in the expansion space 2 as a reserve.

As the battery is being charged, the level of electrolyte within the cells 3 will rise It will flow back through the respective overflow tube 6 into the expansion space 2, but not through the respective inlet tube 5 since the flow resistance formed by the column of liquid in the left portion of the U of the inlet tube and the constriction or choke 11 against flow of electrolyte is greater than the corresponding resistance in the overflow tube 6. If the electrolyte level drops within any one of the cells, further electrolyte liquid is automatically supplied from the expansion space 2 through the inlet 7 and the inlet tube 5 into the cell 3 until the desired electrolyte level 14 again is reached.

FIG. 2 shows a preferred constructional arrangement in accordance with the concept of the invention. This arrangement is particularly simple to construct. The inlet tube' is easily made. The bottom wall 8' of the housing 1' is formed with a stub tube 17, one for each cell 3', which extends downwardly and has a ower opening 18. The lower opening 18 fits into an outside pocket 19 which is molded to the upper side portion 20 of one of the side walls 4' of the battery. The lower opening 18 of the tube stub 17 is spaced from the bottom 21 of the pocket 19 by a small gap; similarly, a small gap 22 is formed between the outer surface of the inlet tube 17 and the inner surface of the wall 20 defining the pocket. This gap 22 is open at the top and terminates in an opening 10' leading into the gas expansion space 9' of the individual cell 3'. The gap 22 and the gap between opening 18 of the tube 17 and the bottom wall 21, together, form the constriction or choke in order to additionally increase resistance against flow.

The structure is particularly easy to make if, in accordance with a preferred form, the upper edges of the pocket 19 are approximately level with the seam line 23 with which the lower wall 4 of the battery box is joined to the upper portion thereof. The overflow tube 6 and the upper wall of the construction in accordance with FIG. 2, as well as the operation are identical to that described in connection with FIG. 1.

Various changes and modifications may be made and features described in connection with any one of the embodiments may be used with any of the embodiments may be used with any of the other, within the scope of the inventive concept.

I claim:
1. Storage battery having a housing (1,4) defining a plurality of adjacently located cells (3) therein, each having an upper wall (8), and a gas expansion and filler chamber (2) common to all the cells, located above the upper wall of said cells (3), said housing being formed with electrolyte inlet means (16) communicating with said common expansion and filler chamber (2);

an inlet duct system comprising a general U-shaped inlet tube (5, 5') having a first downwardly extending portion and a second upwardly extending portion for each cell, in fluid communication with said common expansion and filler chamber (2), the upwardly extending portion being open to communicate with the respective cell (3);

and an overflow tube (6) for each cell, each overflow tube having a lower end located just below the electrolyte level (13) of the respective cell, and below the outlet (10) of the respective U-shaped inlet tube (5, 5'), and extending in fluid communication into the common expansion and filler chamber (2), wherein the improvement comprises
means presenting a greater flow resistance against reverse flow of electrolyte from the respective cell through the respective inlet tube to the common chamber than through the overflow tube, matched to the gas pressure arising in the space between the upper wall (8) of the cell and the electrolyte level (13) therein to draw excess electrolyte from the respective cell through the overflow tube (6) into the expansion and filler chamber (2) before electrolyte in said inlet tube (5, 5') is displaced by gases in said space to permit gas flow through the inlet tube into the expansion and filler chamber (2).

2. Battery according to claim 1, wherein said overflow tube (6) of the respective cell has a substantially lesser resistance to fluid flow than the U-shaped inlet tube associated with the respective cell.

3. Battery according to claim 2, further comprising electrolyte fluid in at least the downwardly extending portion of the inlet (5, 5') to form said means presenting a higher differential flow resistance through said tube.

4. Battery according to claim 1, wherein said means presenting greater flow resistance comprises a constriction or fluid choke (11) in the respective inlet tube (5, 5').

5. Battery according to claim 1, wherein the housing (1, 4) comprises a battery plate box (4'), a pocket (19) formed at the side wall (20) of the said box (4') adjacent each cell (3'), said pocket (19) being open at the top at a level above said electrolyte level (13) and just below the bottom surface of the upper wall of the cell, a tube stub (17) extending into said pocket (19) from the upper surface of said upper wall (3) with clearance from the side walls (20, 21) of said pocket to form with said side walls said U-shaped inlet tube, the bottom opening (18) of said stub tube (17) being slightly spaced from the upper surface of the bottom (21) of the pocket to form a fluid communication gap between the stub (17) and the walls defining said pocket.

6. Battery according to claim 5, wherein said gap is narrow and forms a fluid choke or constriction (11').

7. Battery according to claim 5, wherein the length of the tube stub (17) forming the downwardly directed portion of the U-shaped tube is longer than the height of the overflow tube (6) above the upper wall (8) defining the cell.

8. Battery according to claim 1, wherein the overflow tube (6) extends above the upper wall (8) separating the gas expansion and filler chamber (2) from the cell (3), and wherein the first downwardly extending portion of the U-shaped tube extending from said chamber (2) is longer than the portion of the overflow tube (6) above said separating wall (8).

9. Battery according to claim 5, wherein the upper edge of the pocket (19) is approximately flush with the upper edge (23) of the battery plate box (4').

10. Battery according to claim 6, further comprising electrolyte fluid in at least the tube stub (17).

* * * * *